(No Model.)
P. H. GRIFFIN.
CONDUIT FOR ELECTRIC RAILWAYS.
No. 421,398. Patented Feb. 18, 1890.
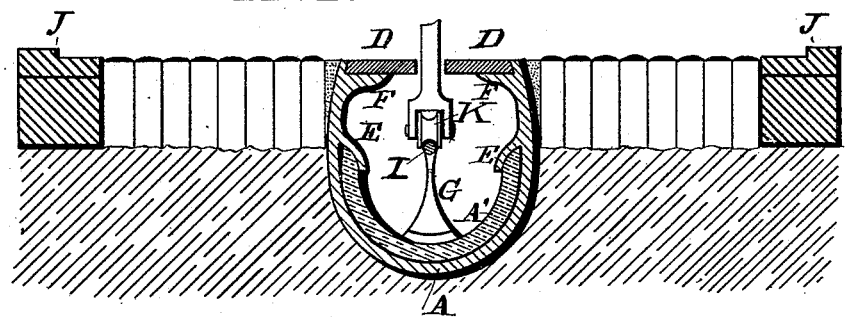
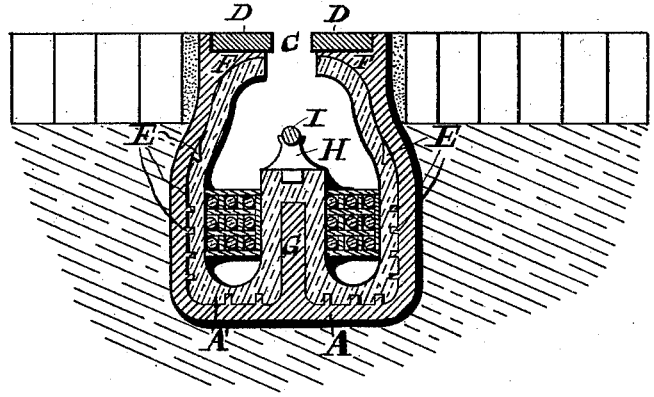
Witnesses:
Wm. O. Stark.
Centie S. Stark.
Inventor:
Patrick H. Griffin
by Michael J. & Wm O. Stark
Attorneys.

UNITED STATES PATENT OFFICE.

PATRICK H. GRIFFIN, OF BUFFALO, NEW YORK.

CONDUIT FOR ELECTRIC RAILWAYS.

SPECIFICATION forming part of Letters Patent No. 421,398, dated February 18, 1890.

Application filed November 9, 1889. Serial No. 329,767. (No model.)

*To all whom it may concern:*

Be it known that I, PATRICK HENRY GRIFFIN, of Buffalo, in the county of Erie and State of New York, have invented certain new and useful Improvements on Conduits for Electrical Railways; and I do hereby declare that the following description of my said invention, taken in connection with the accompanying sheet of drawings, forms a full, clear, and exact specification, which will enable others skilled in the art to which it appertains to make and use the same.

My present invention refers to metallic conduits for electrical wires for electrical cars and other electrical conductors; and it consists, essentially, in the novel and peculiar combination of parts and details of construction, as hereinafter first fully set forth and described and then pointed out in the claims.

In the drawings already mentioned, which serve to illustrate my said invention more fully, Figure 1 is a sectional elevation of my improved metallic conduit. Fig. 2 is a similar view of a modified form of the same, like letters of reference being used in both figures to designate corresponding and analogous parts.

The object of this invention is the production of a metallic underground conduit having an interior lining of a non-conducting substance or material produced either in one piece therewith or attached thereto in such a manner that electrical wires or other electrical conductors may be placed therein and ready access had thereto, and from which wires power may be transmitted for the purpose of propulsion of cars and engines. To attain this result I construct a metallic conduit A of preferably cast-iron (though cast-steel or other cast metals are within the scope of my invention) in the shape of a tube of any desirable form and having a longitudinal opening C of a sufficient width to enable the wires, cables, or other electrical conductors I being placed therein, said longitudinal slots being covered by a wooden or other suitable cover D, made in one or more longitudinal pieces, so as to leave a slotted opening for the passage of means for transmitting power for the propulsion of cars and engines.

In the metallic body A, I form, by preference, lugs or prongs E, and near the slotted aperture C ribs F, the latter for the purpose of sustaining the cover or covers D, and the former for the object of retaining the non-conducting lining A' in proper position, as hereinafter to be referred to.

In the interior of the metallic body A, I form an upwardly-projecting rail G or other proper support, having an auxiliary rail H or other suitable insulator or insulators to carry when this structure is to be used as a conduit for electrical conductors for railway-cars, the wire or electrical cable I, for transmitting electrical power to such car, the said supporting-rail G being formed either in one piece with the metallic conduit or suitably attached thereto and within the same.

In constructing the metallic conduit A, I proceed substantially as follows: I cast the structure in a mold and use a core to cast the same hollow, said core being made of a shell of proper thickness in one or more pieces and of a material composed of, say, one part of silicate of soda to, say, twenty parts of sand, and it has on its outer surface recesses or crevices or indentations into which the molten metal will enter, forming thereby prongs E on the inner surface of the casting, and thereby binding said lining securely to said casting. After drying this core I place the same into the aforesaid mold and proceed to pour the molten metal. The hot iron coming in contact with the core made as aforesaid will harden the same and cause it to firmly adhere to the metal by reason of the prongs aforesaid, so as to form, as it were, an integral part thereof, giving to the interior of the body A, when removed from the mold, a lining of a non-conducting substance similar to artificial stone, so that non-insulated wires placed into the conduit and coming in contact with the interior surface of the same will not thereby be affected electrically.

It will be observed that these conduits, being cast a certain length and suitably connected, form a cheap and very efficient means for retaining the electrical wires and cables for electrical railways where as a return either one or both rails J, or a second wire within said conduit, may be used.

A small conduit of the kind described may be placed into the conduits now used by cable roads now using moving cables as a means for propelling their cars, and connection made with the electrical motor on such car by a "trolley" K, running on the top of said conductor I in a manner readily comprehended, or the metallic conduits now in use may be internally lined with a lining of a non-conducting substance or material, such as heretofore described, or any other suitable material, and provided with supports for the electrical conductors without departing from the nature of my invention.

The insulator H may be a rail constructed of a non-conducting material—such as glass, rubber, &c.—or it may consist of glass insulators—such as are now in common use—at the option of the constructer.

It will be further observed that on both sides of the centrally-located rail G there may be placed a number of the electrical wires of telegraph, telephone, or electric-light stations without interfering with the proper operation of the conductor for transmitting power for the propulsion of the cars or engines.

My conduit may also be made by casting the body A in the ordinary process of casting and then lining the interior of the same with a non-conductor without departing from the principle and nature of my invention.

Having thus fully set forth my invention, I claim as new and desire to secure to me by Letters Patent of the United States—

1. A conduit for electrical conductors, composed of a metallic body with a non-conducting lining attached thereto by means of prongs, as described.

2. A conduit for electrical conductors, composed of a metallic body with a non-conducting lining composed of silicate of soda and sand attached to the inner surface of said metallic body, as and for the purpose set forth.

3. A metallic conduit for electrical conductors, having an inner lining composed of silicate of soda and sand attached to the inner surface of the metallic body by means of prongs on said inner surface, as stated.

In testimony that I claim the foregoing as my invention I have hereto set my hand in the presence of two subscribing witnesses.

PATRICK H. GRIFFIN.

Attest:
MICHAEL J. STARK,
WM. O. STARK.